United States Patent [19]
Frey

[11] Patent Number: 5,046,917
[45] Date of Patent: Sep. 10, 1991

[54] APPARATUS FOR FORMING STACKS OF ACCUMULATOR PLATES

[75] Inventor: Helmut Frey, Ferlach, Austria

[73] Assignee: Akkumulatorenfabrik Dr. Leopold Jungfer, Feistritz im Rosental, Austria

[21] Appl. No.: 530,609

[22] Filed: May 30, 1990

[30] Foreign Application Priority Data

Jun. 7, 1989 [AT] Austria ................................. 1401/89

[51] Int. Cl.[5] ........................ B65G 57/04; B65G 57/08
[52] U.S. Cl. ............................... 414/789.5; 414/792.9; 414/737; 198/418.3; 29/730; 29/809
[58] Field of Search .............. 414/788.5, 788.9, 789.6, 414/789.5, 789.9, 792.8, 793.4, 794.1, 790, 783; 271/149, 150; 198/418.3; 29/730, 743, 809; 270/58

[56] References Cited

U.S. PATENT DOCUMENTS

| | | | |
|---|---|---|---|
| 2,509,467 | 5/1950 | Anderson | 414/789.6 X |
| 2,626,038 | 1/1953 | Smith | 414/792.9 X |
| 2,667,420 | 1/1954 | Muelemans et al. | 414/789.5 X |
| 2,704,593 | 3/1955 | Galloway | 414/792.9 X |
| 3,366,253 | 1/1968 | Walchhüter | 414/790 X |
| 4,314,403 | 2/1982 | Sanekata | 414/790 X |
| 4,462,745 | 7/1984 | Johnson et al. | 271/150 X |
| 4,720,227 | 1/1988 | Eberle | 414/789.5 X |
| 4,955,794 | 9/1990 | Fluck | 414/790 X |

FOREIGN PATENT DOCUMENTS

| 2705509 | 8/1978 | Fed. Rep. of Germany | 414/790.6 |
|---|---|---|---|
| 648263 | 3/1985 | Switzerland | 414/790.6 |

Primary Examiner—Frank E. Werner
Assistant Examiner—Brian K. Dinicola
Attorney, Agent, or Firm—Karl Hormann

[57] ABSTRACT

Apparatus for forming stacks of accumulator plates having an endless horizontal conveyor device (13) for accepting and removing the stacks, whcih are each formed from a predetermined number of plates. To the conveyor device, a device for transferring sets of plates (9) is assigned that can be moved in the vertical direction between, in relation to the conveyor device, a raised position and a lowered transfer position. While in the raised position, the transfer device (9) can be charged alternately and cyclically from magazines (2, 6) located opposite one another in pairs with a negative plate, a separator plate, a positive plate and a separator plate, the transfer device (9) being capable of being lowered stepwise in accordance with the height of a set of plates. While in the lowered transfer position, the transfer device transfers to the intermittently movable conveyor device, the stack of plates formed on said transfer device from a predetermined number of sets of plates. (FIG. 1)

9 Claims, 2 Drawing Sheets

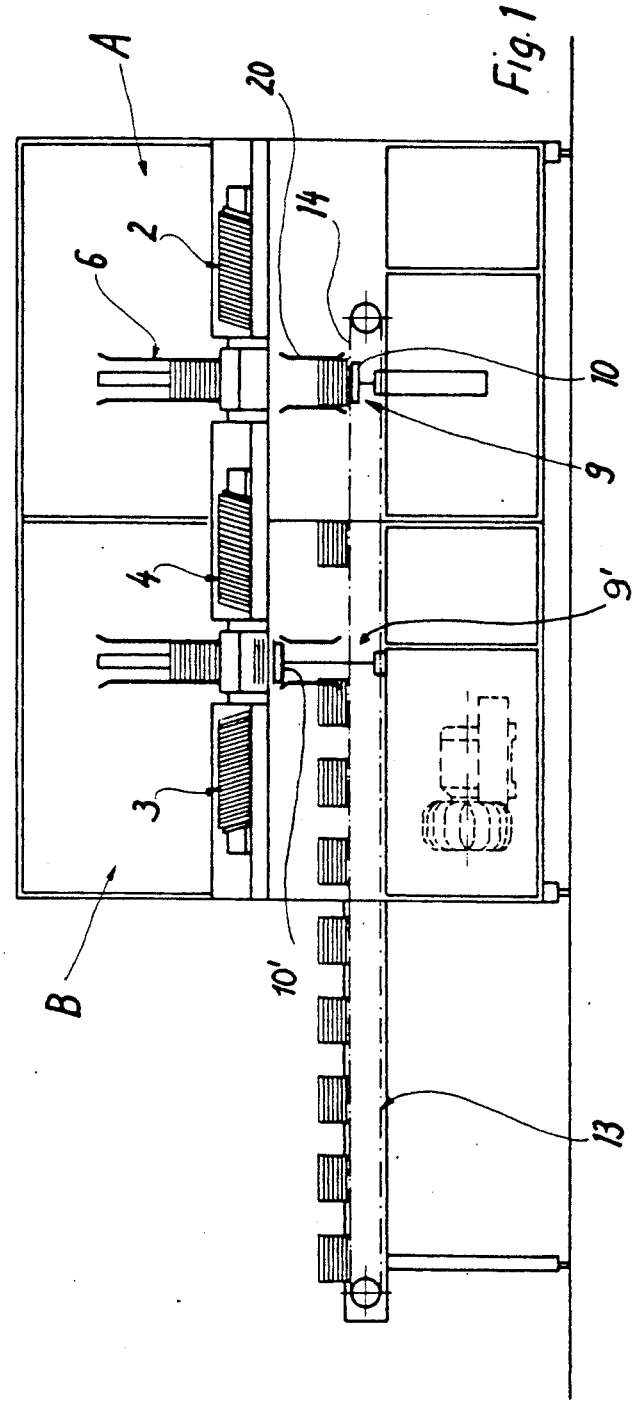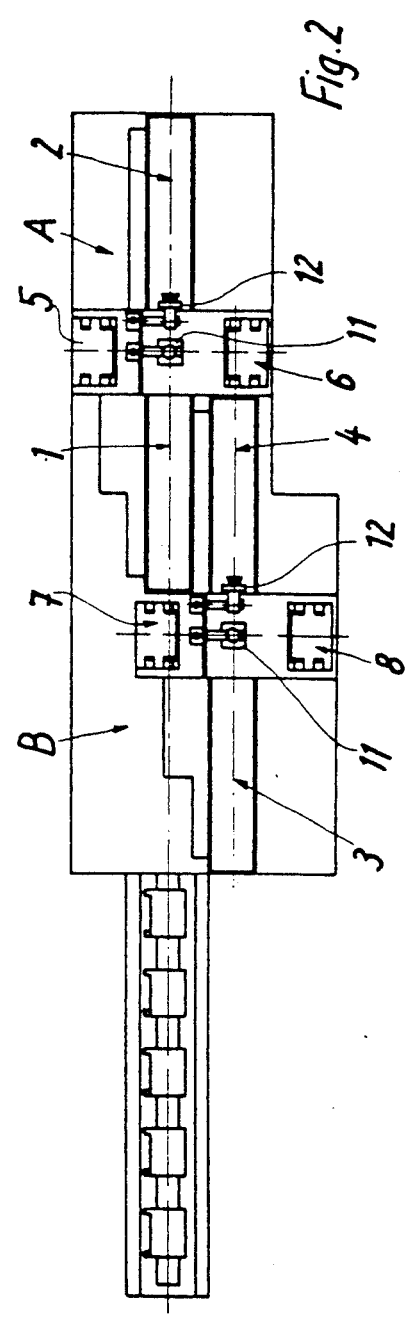

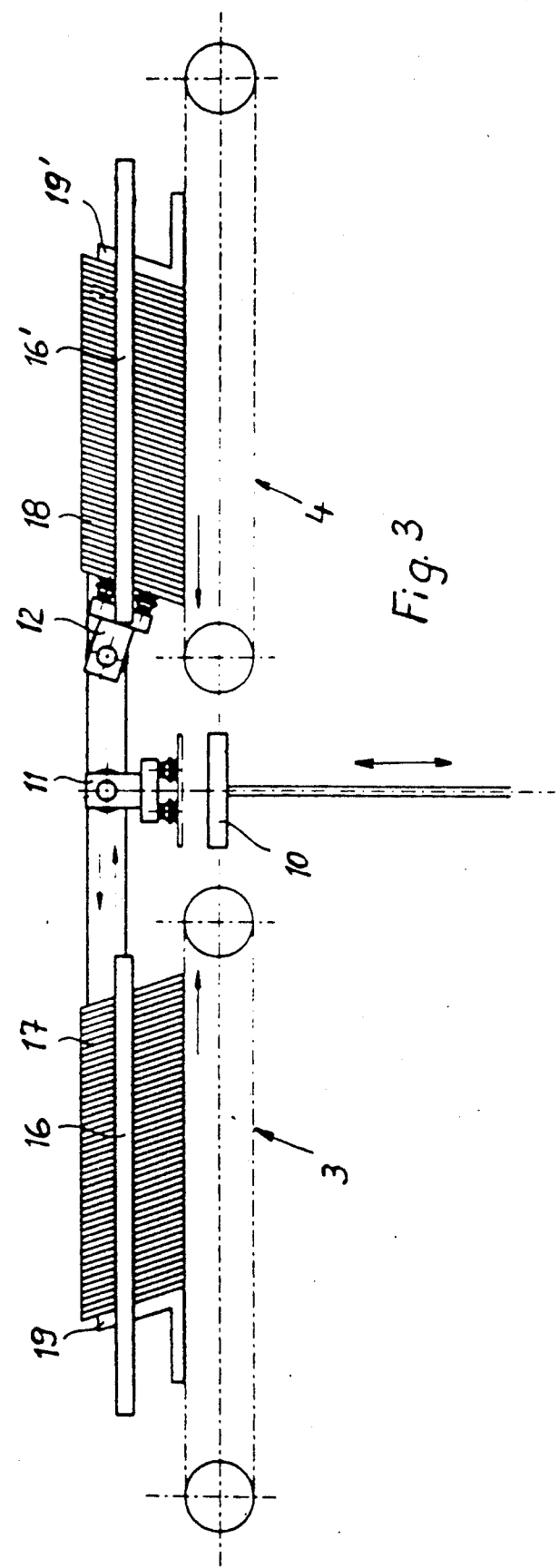

APPARATUS FOR FORMING STACKS OF ACCUMULATOR PLATES

The invention relates to an apparatus for forming stacks of accumulator plates with an endless horizontal conveyor device for accepting and removing the stacks, each of which is assembled of a predetermined number of plates.

BACKGROUND OF THE INVENTION

Heretofore, accumulator plates and the separators were deposited individually on a continuously running conveyor chain, and were only stacked at the end of this conveyor section with the aid of a complicated accepting device to form a set of plates.

It is the object of the invention to create an apparatus for forming stacks of accumulator plates which makes possible an automatic, rapid and simple formation and alignment of stacks, and the removal of the stacks. In an apparatus of the kind referred to, the object is achieved according to the invention in that the conveyor device is provided with a device for transferring sets of plates, which device can be moved in the vertical direction between, in relation to the conveyor device, a raised position, in which the transfer device can be charged alternately and cyclically from magazines positioned, in pairs, opposite one another with a negative plate, a separator plate, a positive plate and a separator plate, the transfer device being capable of being lowered stepwise in accordance with the height of a set of plates into a lowered transfer position, in which the transfer device transfers the stack of plates assembled on it from a predetermined number of sets of plates to the intermittently movable conveyor device.

SUMMARY OF THE INVENTION

The apparatus according to the invention guarantees in a structurally simple fashion a rapid and consequently rational production of the stacks.

Preferably, a device for aligning the stack of plates is associated with the transfer device.

According to a further feature of the invention, the conveyor device comprises conveyor chains running in parallel and having the transfer device placed therebetween and, which preferably has a platform which may be raised and lowered by a pressure medium.

BRIEF DESCRIPTION OF THE DRAWINGS

Further details of the invention are described in more detail below with reference to the drawings, wherein FIG. 1 shows a diagrammatic side view of the apparatus according to the invention; FIG. 2 shows a top view of the apparatus according to FIG. 1; and FIG. 3 shows a representation of a detail of a part of the apparatus according to FIG. 1, in side view.

DESCRIPTION OF THE PREFERRED EMBODIMENTS

FIGS. 1 and 2 represent two parallel groups A, B of apparatuses for forming stacks of accumulator plates and provided with magazines positioned, in pairs, opposite one another magazines 1, 2, and 3, 4, respectively, for plates and magazines 5, 6 and 7, 8, respectively, for separators the direction of movement of the separator magazines extending at a right angle to the direction of movement of the plate magazines. The plate magazines 1 and 3 contain, for example, positive plates, while the plate magazines 2 and 4 contain negative plates. The magazines 1-8 are structurally and functionally substantially identical.

The unloading of the separators from the separator magazines 5, 6, and 7, 8 is preferably done in a conventional manner by which the separators are discharged from the respective stack to the transfer devices 9, 9' by movement imparted to the separator plates by frictional engagement with a roller of elastic material (not shown). Each transfer device is 9, 9' is provided with a platform 10, 10' which is vertically movable by a pressure medium, on which negative and positive plates and separators are deposited alternately from the plate magazines 1, 2 and 3, 4 or separator magazines 5, 6, and 7, 8, the negative and positive plates being deposited, from the plate magazines 1, 2 and 3, 4 with the aid of suction plates 11, 12 mounted for movement between a magazine 3 or 4, respectively, and the platform 10, and pivotable between the inclined position of the plates 17, 18 in the magazines 3 and 4, respectively, and the substantially horizontally disposed top of the platform 10 (see FIG. 3). Once such a set of plates has been assembled, the cycle is repeated, for which purpose the transfer devices 9, 9' are each lowered in accordance with the height of the set. After assembling a stack of plates from a predetermined number of sets of plates, the stack is lowered and transferred by the platform 10 to a conveyor device 13, which, in the example shown comprises parallel conveyor chains 14 between which the transfer device is positioned.

The stacks assembled with plates from magazines 1 and 2 and with separators from magazines 5, 6 are deposited onto the conveyor chains 14 directly from the platform 10, while the stacks formed from plates from magazines 3 and 4 and separators from magazines 7, 8 are pushed, by means of a conventional device (not shown) from the platform 10' onto the conveyor chains 14, the stacks being alternatingly deposited on the conveyor chains 14 by the platforms 10 or 10'. At the discharge end of the conveyor chains 14, the completed stacks are transferred to a further manufacturing station by means of a further device (not shown). As may be seen from FIG. 1, the transfer device is provided with a device 20 for the lateral alignment of the stack of plates, which device has been depicted schematically only, and may consist, e.g. of lateral guides.

FIG. 3 shows as a representation of a detail of all the magazines of the apparatus in accordance with the invention the plate magazines 3, 4 with bristle strips 16, 16', provided for guiding the plates, and with a plate follower 19 or 19' provided for supporting the plates 17, 18 standing in an inclined orientation. The plates 17, 18 are deposited alternately onto the platform 10 by means of the suction plates 11, 12.

The operation of the individual devices described supra is effected by conventional controls (not shown).

It goes without saying that within the scope of the invention the outlined illustrative embodiment can be modified in various ways. In particular, it is not imperative for the additional second group of devices B to be present. Furthermore, the plate magazines and separator magazines may be constructed other than as represented.

We claim:

1. An apparatus for assembling a stack of a predetermined number of sets of accumulator plates, comprising:

a plurality of magazine means each storing, in a substantially upright orientation, a different kind of accumulator plate of said set;

transfer means adapted for receiving, in a first plane, said predetermined number of sets thereon;

stationary means associated with said transfer means in said first plane for precisely aligning said sets in superposition;

means for sequentially feeding one plate at a time from its upright orientation in each magazine to a substantially level orientation on said transfer means for assembling said stack thereon;

conveyor means adapted for removing, in a second plane, said stack from said transfer means; and means for initially moving said transfer means relative to said aligning means from said first plane in increments substantially equal to each set of plates received thereon and for thereafter moving said transfer means to position said stack in said second plane for removal by said conveyor means.

2. The apparatus according to claim 1, wherein said conveyor means comprises means moving in parallel and wherein said transfer means is positioned intermediate said moving means for movement between said first and second planes.

3. The apparatus according to claim 1, wherein said transfer means comprises a vertically movable platform adapted to support said plates on said stack, and said means for moving said platform comprises pressure-medium operated means.

4. The apparatus of claim 1, wherein said plurality of magazine means are placed around said transfer means at equal angular spacings.

5. The apparatus of claim 4, wherein said plurality of magazine means is four.

6. The apparatus of claim 5, wherein said means for feeding comprises pivotally movable suction means.

7. The apparatus of claim 6, wherein said plates in magazines on opposite sides of said transfer means are stored along a line intersecting said transfer means.

8. The apparatus of claim 4, wherein a first pair of oppositely placed magazine stores positive and negative plates, respectively, and wherein a second pair of oppositely placed magazines stores separator plates.

9. The apparatus of claim 1, wherein said substantially upright orientation or said plates in said magazines includes a slightly inclined orientation.

* * * * *